(12) United States Patent
Hellgren

(10) Patent No.: US 7,096,774 B2
(45) Date of Patent: Aug. 29, 2006

(54) HIGH PRESSURE PRESS, METHOD FOR OPERATING A HIGH PRESSURE PRESS AND USE OF SUCH A PRESS

(75) Inventor: Keijo Hellgren, Västerås (SE)

(73) Assignee: Avure Technologies AB, Vasteras (SE)

( * ) Notice: Subject to any disclaimer, the term of this patent is extended or adjusted under 35 U.S.C. 154(b) by 322 days.

(21) Appl. No.: 10/415,123

(22) PCT Filed: Nov. 7, 2001

(86) PCT No.: PCT/SE01/02442

§ 371 (c)(1),
(2), (4) Date: Oct. 27, 2003

(87) PCT Pub. No.: WO02/38363

PCT Pub. Date: May 16, 2002

(65) Prior Publication Data

US 2004/0074404 A1    Apr. 22, 2004

(30) Foreign Application Priority Data

Nov. 9, 2000  (SE) .................................. 0004104

(51) Int. Cl.
*B30B 1/32* (2006.01)
(52) U.S. Cl. ...................... 92/86; 92/183; 100/269.05

(58) Field of Classification Search .................. 92/86, 92/174, 182, 183; 100/269.05, 269.08, 245
See application file for complete search history.

(56) References Cited

U.S. PATENT DOCUMENTS

| | | | |
|---|---|---|---|
| 3,230,977 A * | 1/1966 | Mercier | 92/183 |
| 4,229,965 A | 10/1980 | Spacek et al. | 72/453.13 |
| 5,370,043 A | 12/1994 | Träff et al. | 99/467 |
| 5,622,105 A | 4/1997 | Bergman | 100/245 |
| 5,791,655 A | 8/1998 | Daniel et al. | 277/300 |

FOREIGN PATENT DOCUMENTS

| | | |
|---|---|---|
| EP | 0 772 981 A1 | 5/1997 |
| GB | 767046 | 1/1957 |

* cited by examiner

*Primary Examiner*—Thomas E. Lazo
(74) *Attorney, Agent, or Firm*—Harness, Dickey & Pierce, P.L.C.

(57) ABSTRACT

A high pressure press for treatment of substances such as food includes a floating piston in a pressure chamber, with seals. The floating piston has drainage system for collecting any pressure fluid that leaks past a seal of the floating piston. The drainage system includes a pressure reducer arranged inside the floating piston. The drainage system also includes an elastometic pad which is so arranged as to supply an underpressure to a space where pressure fluid leaking past a seal may collect. Collected pressure fluid is returned to the pressure chamber later in the cycle.

13 Claims, 2 Drawing Sheets

HIGH PRESSURE PRESS, METHOD FOR OPERATING A HIGH PRESSURE PRESS AND USE OF SUCH A PRESS

TECHNICAL AREA

The present invention relates to a device and method used in conjunction with high pressure presses in the areas of isostatic pressing and the high pressure treatment of substances. The present invention relates to a high pressure press with a new type of piston and a method for draining said piston.

BACKGROUND ART

For some time now high pressure treatment has been used as a method for inactivating micro-organisms and certain enzymes in substances such as foodstuffs and other provisions. A decisive factor for obtaining a good result from a high pressure treatment is that the pressure is sufficiently high. During treatment of food or provisions, the pressure is usually set at a pressure between 1,000–10,000 bar. Such high pressures make however extreme mechanical demands on presses used for high pressure treatment.

It is economically desirable to process food and similar substances with a high throughput. It is known to make high pressure presses with a substantially cylindrical vessel in which a first substance is separated from a second substance, a pressurisation medium, by a floating piston. Pressure exerted by the pressurisation medium is transferred to the substance by the floating piston. This approach offers an advantage of a rapid throughput of product to be treated.

In EP 0 772 981 A1 a high pressure press of the floating piston type is disclosed. The press is made of a cylinder, sealed at the top 3 and bottom, with the enclosed space divided into two chambers by a freely moving piston. One chamber contains pressurisation fluid, while the other contains product for treatment. Each chamber has inlet and outlet pipes equipped with valves. The valves through which product enters and leaves the treatment chamber are incorporated in the top of the press, and the valve which allows pressurisation fluid to be released is incorporated in the base.

However, there are certain disadvantages with known types of free moving or floating pistons with a piston sealing means such as the one described. Under extremely high pressure, a sealing means of the type such as 4A in piston 4 shown in FIGS. 1, 3 of EP 0 772 981 A1 described could be liable to expand under pressure to an extent that does not exactly follow the expansion behaviour of the cylinder. This may be expected with conventional seals of the Bridgeman type under extremely high pressure. A reduced sealing effect of the sealing means between the piston and the cylinder it is in would allow leakage of product and/or pressurisation fluid past the sealing means. This means that either a high pressure press has to be run with longer cycle times at lower pressures to avoid leakage at high pressure, or run at high cycle times with a risk of contamination taking place. A degree of contamination of product is permissible when the pressurising fluid is clean and compatible with the product. However, this imposes further limits in respect of service life for pressurisation fluid and further treatment stages and equipment needed for filtering or cleaning the pressurisation fluid.

SUMMARY OF THE INVENTION

It is an object of the invention to provide a press with a piston which does not allow the leakage of pressurisation fluid into a product chamber, or of product into a pressurisation fluid chamber.

It is a further object of the invention to provide a means for collecting a pressurisation fluid or product that leaks from a pressurised chamber.

It is a still further object of the invention to provide a means for collecting and removing a pressurisation fluid or product that leaks from a pressurised chamber.

These and other objects are realised by a high pressure press, a method for operating a high pressure press, and/or a method of draining. At least one embodiment of the present invention comprises a high pressure press including a pressure chamber and a floating piston with sealing means, in which said floating piston comprises a drainage means for collecting a fluid that leaks past the sealing means of the floating piston.

The invention is based on the understanding that even though fluid leaks past one of the sealing means of the floating piston into a space between the sealing means, draining may effectively be accomplished by utilising the actual floating piston for leading fluid away from said space. Thus, external drainage means are redundant since the floating piston itself will function as or include a drainage means. This is obviously advantageous, since existing presses may without much effort be provided with a floating piston in accordance with the invention.

Thus, according to the invention the floating piston comprises a therein arranged drainage means for collecting into the floating piston, from a space located between the sealing means, any fluid that leaks past a sealing means of the floating piston.

One benefit of the present invention is that a pressurisation medium and a product for treatment are prevented from mixing with and contaminating each other. This allows production cycles which are both rapid and at high pressure, enabling increased productivity for the machine and process. Another advantage is that equipment and operating procedures are simplified. Prevention of leakage and mixing of product with pressure medium means that no additional separation or cleaning, sterilisation, filtration etc of the pressurisation fluid is required. This means that production may be carried out more quickly and at lower cost. In addition, there is a time and cost saving because no process steps are required to clean or de-contaminate pressurisation fluid, which fluid should also have a longer service life.

Another advantage is, as mentioned above, that a floating piston according to the invention may be retrofitted to existing high pressure presses using a floating piston according to the known art, thus improving existing equipment for a lower cost than a purchase of a complete new press. A further advantage of the device is that it may be applied to a wider range of foodstuffs or even other substances including biological or pharmaceutical substances because high pressure treatment is more economical using the present invention than existing presses. The invention may be applied within a device used as a pressure intensifier for any fluid.

The fluid is suitably collected into the floating piston, or into a cylinder of the floating piston, by some type of pressure control. One way is to reduce the pressure inside the floating piston, or inside the cylinder of the floating piston, so as to attain a pressure therein that is lower than the pressure in the space between the sealing means outside the piston. The created pressure difference will drive fluid, if present, from said space into the floating piston. The floating piston is preferably provided with a non-return valve in a channel that provides communication between the space and the inside of the floating piston, ensuring that collected fluid does not return to said space.

The lower pressure inside the floating piston is suitably a generated under-pressure. The under-pressure may be accomplished by enlarging the enclosed air volume inside the floating piston, without substantial change of the quantity of air molecules therein.

The enclosed air volume inside the floating piston may suitably be defined, inter alia, by inner walls of the floating piston and a spring means. Compression of the spring means will increase the enclosed air volume, thereby reducing the pressure.

It has been found that a spring means may advantageously be compressed by simply making use of the generated pressurisation pressure that is used for pressing a product. The advantage of this is that no extra conduits for generating the desired pressure for compressing the spring means is needed. Thus, the applied pressurisation pressure is suitably transferred as a reduced pressure to the spring means inside the floating piston. This is suitably realised by arranging an inner piston inside the floating piston, so that the inner piston is movable inside the floating piston in response to the pressure to which it is subjected. The inner piston preferably has a first end portion facing the pressure chamber in which the pressurisation pressure is applied, and a second end portion facing the spring means inside of the floating piston. By designing the second end portion as having a larger end surface area than that of the first portion, a reduced pressure will be transferred to the spring means.

Thus, one and the same pressurisation pressure is used for causing the floating piston to exert pressure on a product and for causing the inner piston to exert pressure on the spring means.

According to the above it is possible to collect fluid that has leaked into the space between the sealing means. The collected fluid may after a press cycle be disposed of in any suitable manner.

An alternative is to recover any fluid that has leaked into the space between the sealing means. Thus, the drainage means may further be arranged to return collected fluid into the pressure chamber of the press. Suitably, the floating piston is provided with a channel having a non-return valve, wherein this channel is an established communication between the pressure chamber and the inside of the floating piston. The non-return valve prevents fluid from flowing from the pressure chamber into the floating piston.

After the actual pressing operation is completed, the pressure in the pressure chamber is reduced. If the pressure is reduced to a lower level than that of the pressure inside the floating piston, then collected fluid will, due to the pressure difference, be driven into the pressure chamber. This is obviously advantageous, since this allows for fluid that has leaked to be used again.

BRIEF DESCRIPTION OF THE DRAWINGS

The present invention will be described in more detail in connection with the enclosed drawings.

DETAILED DESCRIPTION OF THE DRAWINGS

Figure 1:
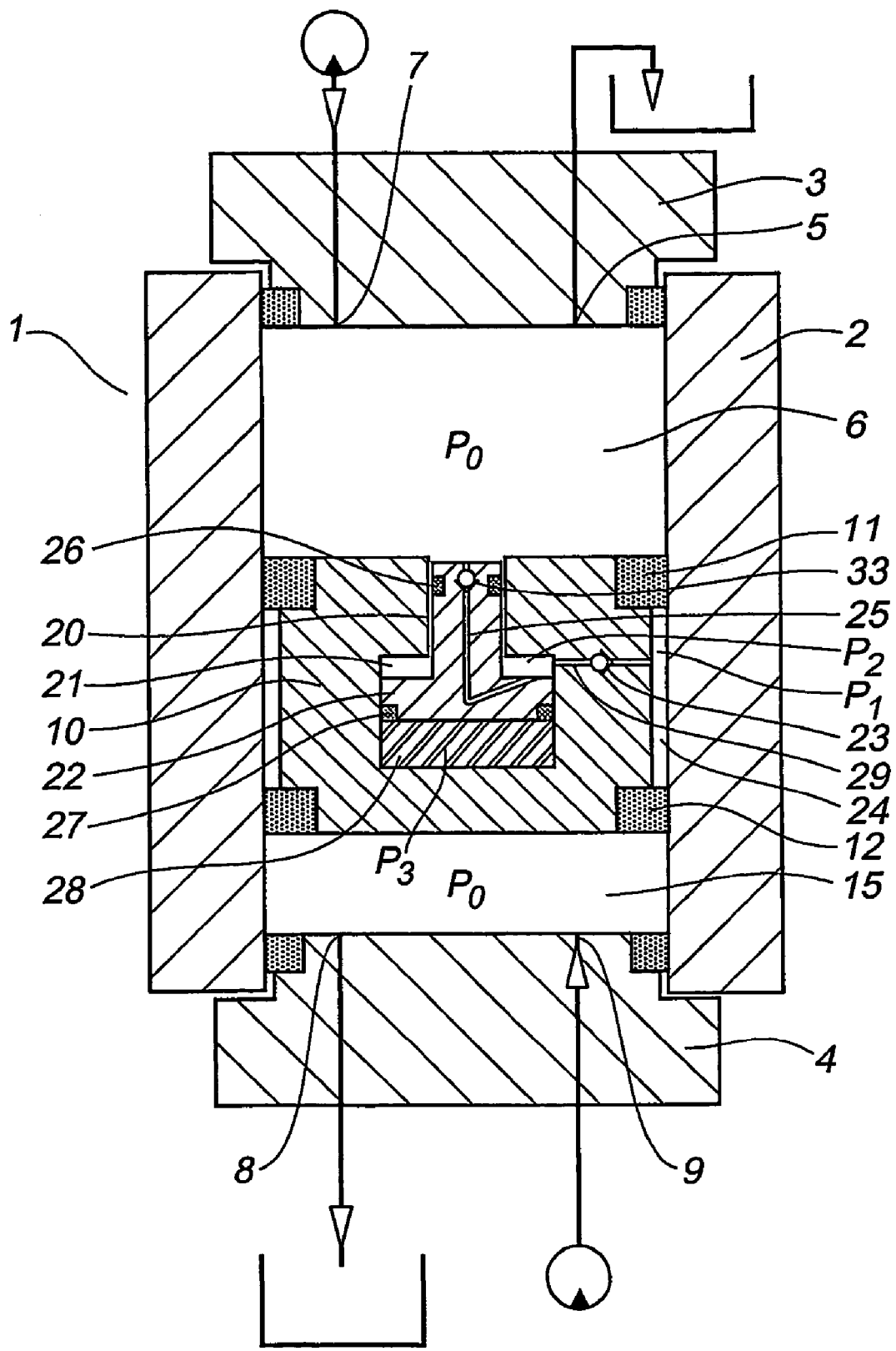
FIG. 1 shows schematically a cross section view of a high pressure press with a floating piston according to an embodiment of the present invention.

The present invention will first be described in reference to the design schematically shown in FIG. 1. The figure shows a cylindrical high pressure press 1 comprising a pressure chamber 2 and a floating piston 10. A pressurisation medium 6, is indicated above the floating piston and a first substance, a product 15 to be treated, is shown below the piston.

The pressure chamber 2 is sealed at the top and bottom by end caps 3, 4. Top end cap 3 comprises a valve means 7 for the pressure medium 6 to enter the pressure chamber and a valve means 5 for excess pressure medium to be removed after treatment as required. Product 15 is pumped into pressure chamber 2 through the bottom end cap 4 via a valve means 9 and removed after treatment through another valve means 8.

The floating piston 10 comprises a second piston 22. Piston 22 has two different diameters, a smaller diameter part in a cylindrical bore 20 and a larger diameter part in a connected bore 21. A sealing means 26 is arranged on the small end of piston 22 and another sealing means 27 arranged on the large diameter of piston 22 in bore 21. Piston 22 also comprises a passageway or channel 25 including a non-return valve 33. A new and inventive component, an elastomeric pad 28 is located in the bottom of the larger bore 21 beneath piston 22.

Floating piston 10 comprises an upper and lower sealing means 11, 12 between the piston and the pressure chamber. A space 24 is shown, drawn somewhat exaggerated in size for the sake of clarity, between piston 10 and walls 2 of the pressure chamber. The space 24 is further defined at the top and bottom by the upper and lower sealing means 11, 12. A channel 29 is arranged in the floating piston 10 communicating between the space 24 and a cylinder 21 of the drainage means. Channel 29 is equipped with a non-return valve 23.

At the beginning of a production cycle in the high pressure press according to the preferred embodiment of the present invention, product 15 to be treated is led into the lower chamber. Excess pressure medium in the upper chamber 6 is allowed to leave the upper chamber through outlet valve 5 so that the lower chamber can be filled with product to be treated. Once the lower chamber contains sufficient product, inlet valve 9 is closed and outlet valve 8 in the lower chamber is closed.

Pressurisation is carried out by pumping in a pressurisation fluid medium to the upper chamber through valve 7. A pressure of $P_0$ builds up in the upper chamber which is transferred by floating piston 10 to the product 15 in the lower chamber. The pressure is built up to a working pressure between 3–10,000 bar and preferably around 4,000 bar. The actual holding pressure selected for use as a treatment pressure, $P_0$, depends on the type of fluid being treated and the type of enzyme, micro-organism or bacteria that is to be in activated. The holding pressure commonly ranges up to between 5–7,000 bar.

Under high pressure, a pressure difference can occur in the closed space 24 between the seals 11, 12 of floating piston 10. A reduced pressure $P_1$ can occur in the space 24 around the floating piston. Because the pressure in space 24 may be reduced to $P_1$ compared to the surrounding pressure $P_0$, leakage of pressure medium can occur into the space 24. Any leakage that occurs is dealt with by a drainage means in piston 22. The pressure transmitted by the pressurisation fluid, shown as $P_0$, influences the smaller diameter end of piston 22, which transfers a reduced pressure $P_3$ via the larger end of the piston in the cylinder bore 21 to the elastomeric pad 28. Pressure $P_0$ rises during a treatment cycle causing pressure $P_3$ to rise proportionally, gradually compressing elastomeric pad 28. Compression of elastomeric pad 28 produces an under-pressure $P_2$ in drainage means cylinder 21, which pressure is arranged to be less than the pressure $P_1$ in the space 24 between the seals 11, 12 at this point in the pressure cycle. Thus any pressure medium that has leaked into the space 24 is drained via channel 29 into cylinder 21. Valve 23 between space 24 and cylinder 21 is a non-return valve, as is valve 33, in the channel communicating between cylinder 21 through piston 22 into the upper pressure chamber 6.

During reduction of pressurisation of the press, any pressure medium that has leaked into space 24 is led by the pressure difference $(P_1-P_2)$ into drainage means cylinder 21 through channel 29 equipped with the non-return valve 23. Generally during pressure reduction $P_2$ is always greater than $P_1$. When the pressure $P_0$ in the press is reduced, pressure medium in drainage means cylinder 21 is led via channel 25 and the non-return valve 33 back into upper pressure chamber 6 as soon as the pressure $P_2$ in cylinder 21 exceeds the pressure in the upper chamber, $P_0$.

In this way, pressure fluid from the upper chamber 6 leaking past sealing means 11 into the space 24 is returned to upper chamber without contacting the product in the lower chamber 15.

Figure 2:
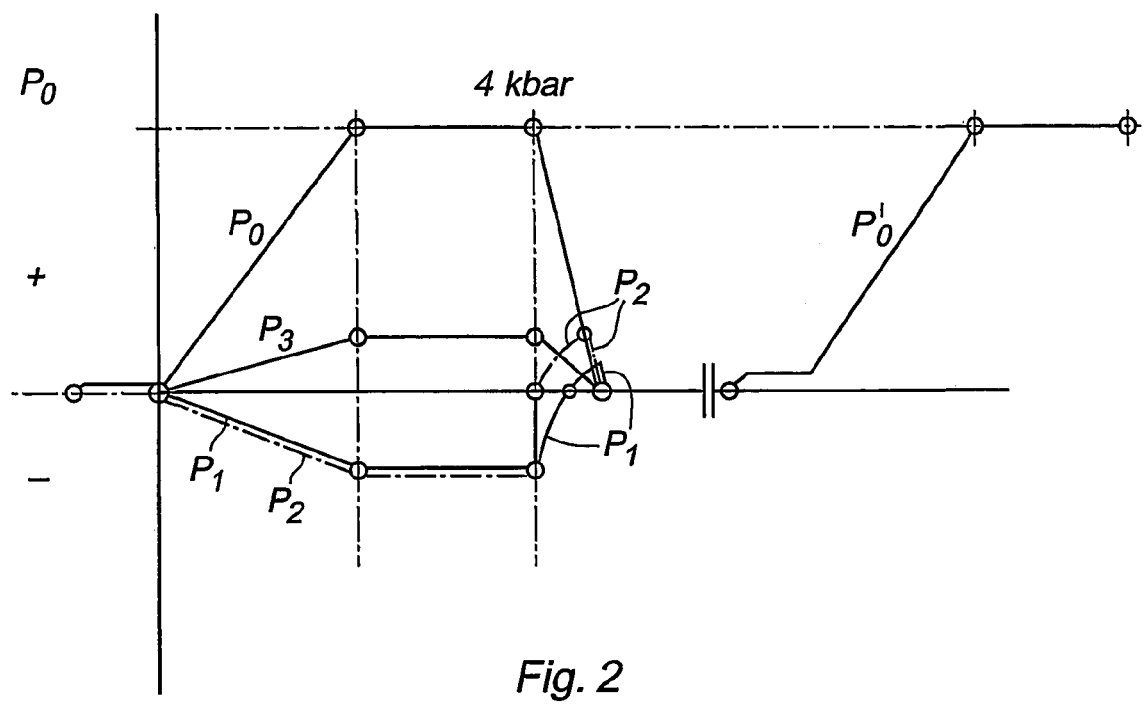
FIG. 2 shows schematically a graph of pressure and time according to a method of operating a press according to an embodiment of the invention.

FIG. 2 shows a pressure versus time curve for a high pressure press according to an embodiment of the invention. Pressure in the pressure chamber is shown by $P_0$, pressure in the space 24 between seals is shown as $P_1$, pressure in drainage means cylinder 21 is shown as $P_2$ and pressure in the elastomeric pad 28 of the drainage means is shown as $P_3$. A production cycle begins with $P_0$ increasing. Pressure $P_0$ is transferred by the piston 22 of the drainage means as a reduced pressure $P_3$ to elastomeric pad 28. Pressure $P_3$ on the elastomeric pad 28, although reduced from $P_0$ by pressure reducer function of the drainage means, increases in proportion to pressure $P_0$. An under-pressure $P_1$ is gradually produced in the space 24 between the seals as is another under-pressure $P_2$ in the drainage means cylinder 21.

Pressure in the pressure chamber $P_0$ is held steady at a suitable holding pressure or treatment pressure for a predetermined time, the pressure shown here for example as 4 Kbar.

As $P_0$ reduces it can be seen in the diagram that the under-pressure $P_2$ in the drainage means is reduced and changes instead to a slight overpressure driving any pressure fluid collected in cylinder 21 through non return valve 33 into the pressure chamber 6. Thus during the majority of the pressure reduction phase $P_2$ is always greater than $P_1$. At the same time under-pressure $P_1$ begins to reduce, lagging slightly after $P_2$ as the pressure difference between $P_0$ and $P_1$ is reduced, such that $P_1$ changes to a small over-pressure before $P_0$ returns to zero.

In the preferred embodiment of the invention, the invention has been described in terms of collecting leakage of pressure fluid and returning it to a pressure chamber without making contact with the product. In another embodiment of the invention leakage of a fluid product past a sealing means such as 11 or 12 is collected and returned to the pressure chamber without making contact with a pressurisation fluid.

In a yet further embodiment of the invention the elastomeric pad 28 of the drainage means in piston 10 may be substituted by a spring, such as a coil spring made of a suitable stainless steel. The spring is simpler to arrange and may have a long service life. Since it does not fill the volume under piston 22, additional drainage channels and means to remove leaked fluid that collects under piston 22 may suitably be provided.

In a further embodiment of the invention the drainage means of piston 10 may be a passive drainage means. A hollow space inside piston 10, such as a chamber where cylinder 21 is in FIG. 1, but without any moving parts such as piston 22, connected by one or more channels such as 25 communicating with the space 24 between the seals 11, 12 of piston 10. For a passive drainage means, cylinder 21 would be arranged lower down in piston 10 so that fluid would collect below the height of the space 24 between the seals 11, 12 of piston 10. Such a passive drainage means is simple to arrange.

In another embodiment of the invention a filter may be provided for preventing any undesirable compounds in the form of loosened metal particles from being led into the pressure chamber 6. Such a filter may e.g. be provided in channel 25. Alternatively, if return of fluid is not necessary and a return conduit such as channel 25 is omitted, then fluid and any other particles are collected and disposed of after one or more pressing operations.

Apart from the draining means described above, other alternatives are also conceivable. The inventive concept of making use of the floating piston for draining the space between the sealing means may e.g. be realised as follows. The floating piston may be provided with a wheel or a pulley which protrudes into the space between the sealing means and which abuts the inner wall of the press. During a pressing operation, as the floating piston is moved, the wheel is also caused to move, rolling along the inner wall of the press. Thus, the rolling wheel may be used to drive any suitable pumping means. For instance, the wheel may be a gear wheel in a rotary pump, in which two meshing gear wheels contrarotate so that leaked fluid is entrained from said space between the sealing means and discharged on the other side into a conduit in the floating piston.

It should be noted that numerous modifications and variations can be made without departing from the scope of the present invention defined in the accompanied claims.

Thus, it is to be understood that even though some specific embodiments and configurations have been described, they are primarily elucidative examples for the ease of understanding. Obviously, many others are conceivable.

The invention claimed is:

1. A high pressure press comprising:
   a pressure chamber;
   a floating piston within the pressure chamber;
   a plurality of seals between the piston and a wall of the pressure chamber; and
   drainage means for collecting into the floating piston, from a space defined between two of the plurality of seals and further defined by the floating piston and a wall of the pressure chamber, any fluid that leaks past one of the plurality of seals, wherein the drainage means comprises a pressure reducer arranged inside said floating piston, and so arranged subject to a press pressurization pressure $P_0$ such as to transfer the pressure $P_0$ as a reduced pressure $P_3$ to a spring of the drainage means and wherein the spring of the drainage means comprises an elastomeric pad located in a cylinder of the drainage means.

2. A high pressure press comprising:
   a pressure chamber;
   a floating piston within the pressure chamber;
   a plurality of seals between the piston and a wall of the pressure chamber; and
   drainage means for collecting into the floating piston, from a space defined between two of the plurality of seals and further defined by the floating piston and a wall of the pressure chamber, any fluid that leaks past one of the plurality of seals, wherein the drainage means comprises a pressure reducer arranged inside said floating piston, and so arranged subject to a press pressurization pressure $P_0$ such as to transfer the pressure $P_0$ as a reduced pressure $P_3$ to a spring of the drainage means, and wherein the pressure reducer of the drainage means is connected via a non-return valve to the space between the seals such that fluid present in the space is led into the drainage means.

3. The high pressure press according to claim 2, wherein the pressure reducer of the drainage means is connected via a non-return valve to a first part of the pressure chamber.

4. The high pressure press according to claim 3, wherein said first part of the pressure chamber is adapted to contain a pressure medium, and a second part of the pressure chamber is adapted to contain a product to be treated.

5. A method for operating a high pressure press to provide pressure treatment for a product, comprising:
introducing product into a pressure chamber;
applying a pressure $P_0$ via a pressure medium in a first part of the pressure chamber and via a floating piston in the pressure chamber between the first part and a second part of the pressure chamber to a product in the second part of the pressure chamber;
producing a reduced pressure $P_1$ in a space between seals of the floating piston;
reducing the pressure $P_0$ in the pressure chamber; and
pumping any fluid present in a drainage cylinder within the floating piston into the first part of the pressure chamber when a pressure $P_2$ in the drainage cylinder exceeds the pressure $P_0$ in the first part of the pressure chamber.

6. The method according to claim 5, further comprising the step of:
leading any fluid present in the space from the space into the drainage cylinder by means of a channel connecting both, which channel is equipped with a first non-return valve.

7. The method according to claim 6, further comprising the step of:
transferring any fluid present in the drainage cylinder into the first part of the pressure chamber by means of a channel connecting the cylinder and the first part of the pressure chamber, which channel is equipped with a second non-return valve.

8. A method of draining a space in a high pressure press including a pressure chamber and a floating piston with a plurality of seals between the piston and a wall of the pressure chamber, said space being defined between two of the plurality of seals of the floating piston, and further defined by the floating piston and a wall of the pressure chamber, comprising:
collecting into the floating piston, from said space, any fluid that leaks past one of the plurality of seals of the floating piston, said collecting step comprising the steps of:
reducing a pressure inside said floating piston, such as inside a cylinder within the floating piston, to a pressure $P_2$ which is lower than a pressure $P_1$ in said space; and
draining, due to the pressure difference $P_1-P_2$, said fluid via a channel into the floating piston.

9. The method according to claim 8, wherein the reducing step comprises the step of:
increasing an enclosed air volume inside the floating piston, whereby the pressure of the air volume is reduced.

10. The method according to claim 8, wherein said reducing step comprises the steps of:
applying a press pressurization pressure $P_0$ to the floating piston; and
transferring the applied pressure $P_0$ as a reduced pressure $P_3$ to a spring inside the floating piston, whereby the compression of the spring reduces the pressure inside the floating piston.

11. A method of draining a space in a high pressure press including a pressure chamber and a floating piston with a plurality of seals between the piston and a wall of the pressure chamber, said space being defined between two of the plurality seals of the floating piston, and further defined by the floating piston and a wall of the pressure chamber, comprising:
collecting into the floating piston, from said space, any fluid that leaks past one of the plurality of seals of the floating piston; and
leading any fluid present inside the floating piston into a first part of the pressure chamber by means of a channel connecting the floating piston and the first part of the pressure chamber.

12. The method according to claim 11, further comprising the step of:
leading any fluid present inside the floating piston into a first part of the pressure chamber by means of a channel connecting the floating piston and the first part of the pressure chamber by reducing the press pressurization pressure $P_0$ so as to fall below the pressure $P_2$ inside the floating piston, whereby said fluid is led from the floating piston to the pressure chamber due to the pressure difference $P_2-P_0$.

13. A device for use in a high pressure press having a pressure chamber, comprising:
a piston sized and configured to float within the pressure chamber and to transfer pressure from a first side of the piston to a second side thereof;
a first seal positioned between the piston and a wall of the pressure chamber, the first seal configured to prevent passage of fluid from the first side of the seal past the piston;
a second seal positioned between the piston and a wall of the pressure chamber, the second seal configured to prevent passage of fluid from the second side of the seal past the piston;
a space between the first and second seals, and between the piston and the wall of the pressure chamber, the space configured to trap fluid that leaks past the first or second seals; and
means for transferring trapped fluid from the space to the first side of the piston.

* * * * *